United States Patent [19]

Barker et al.

[11] Patent Number: 5,759,715
[45] Date of Patent: Jun. 2, 1998

[54] LITHIUM ION BATTERIES CONTAINING PRE-LITHIATED ELECTRODES

[75] Inventors: Jeremy Barker; Mohamed-Yazid Saidi; Jeffrey L. Swoyer; Feng Gao, all of Henderson, Nev.

[73] Assignee: Valence Technology, Inc., Henderson, Nev.

[21] Appl. No.: 723,195

[22] Filed: Sep. 27, 1996

Related U.S. Application Data

[63] Continuation-in-part of Ser. No. 630,402, Apr. 10, 1996, Pat. No. 5,643,695, which is a continuation-in-part of Ser. No. 533,882, Sep. 26, 1995, Pat. No. 5,660,948.

[51] Int. Cl.$^6$ .................................................. H01M 10/40
[52] U.S. Cl. .................................... 429/197; 429/218
[58] Field of Search .............................. 429/194, 196, 429/197, 218; 423/448

[56] References Cited

U.S. PATENT DOCUMENTS

| | | |
|---|---|---|
| 4,517,265 | 5/1985 | Bélanger et al. |
| 4,668,595 | 5/1987 | Yoshino et al. |
| 4,725,422 | 2/1988 | Miyabayashi et al. |
| 4,945,014 | 7/1990 | Miyabayashi et al. |
| 4,959,281 | 9/1990 | Nishi et al. |
| 5,028,500 | 7/1991 | Fong et al. |
| 5,130,211 | 7/1992 | Wilkinson et al. |
| 5,176,969 | 1/1993 | Miyabayashi et al. |
| 5,187,035 | 2/1993 | Miyabayashi et al. |
| 5,192,629 | 3/1993 | Guyomard et al. |
| 5,310,553 | 5/1994 | Simon et al. |
| 5,326,658 | 7/1994 | Takahashi et al. |
| 5,352,548 | 10/1994 | Fujimoto et al. |

OTHER PUBLICATIONS

A.N. Dey and B.P. Sullivan, "The Electrochemical Decomposition of Propylene Carbonate on Graphite", J. Electrochem. Soc., vol. 117, No. 2, 222–224, Feb. 1970.

J.R. Dahn, A.K. Sleigh, H. Shi, J.N. Reimers, Q. Zhong, and B.M. Way, "Dependence of the Electrochemical Intercalation of Lithium in Carbons on the Crystal Structure of the Carbons", Electrochimica Acta, vol. 38, No. 9, 1179–1191, 1993.

Z.X. Shu, R.S. McMillan, and J.J. Murray, "Electrochemical Intercalation of Lithium into Graphite", J. Electrochem. Soc., vol. 140, No. 4, 922–927, Apr. 1993.

J. Barker, "Three Electrode Electrochemical Voltage Spectroscopy (TEVS): Evaluation of a Model Lithium Ion System", Electrochimica Acta, vol. 40, No. 11, 1603–1608, 1995.

A. Mabuchi, K. Tokumitsu, H. Fujimoto, and T. Kasuh, "Charge–Discharge Characteristics of the Mesocarbon Microbeads heat–Treated at Different Temperatures", J. Electrochem. Soc., vol. 142, No. 4, 1041–1046, Apr. 1995.

A. Mabuchi, H. Fujimoto, K. Tokumitsu, and T. Kasuh, "Charge–Discharge Mechanism of Graphitized Mesocarbon Microbeads", J. Electrochem. Soc., vol. 142, No. 9, 3049–3051, Sep. 1995.

Z.X. Shu, R.S. McMillan, J.J. Murray, and I.J. Davidson, "Use of Chloroethylene Carbonate as an Electrolyte Solvent for a Lithium Ion Battery Containing a Graphitic Anode", J. Electrochem. Soc., vol. 142, No. 9, L161–L162, Sep. 1995.

(List continued on next page.)

*Primary Examiner*—Anthony Skapars
*Attorney, Agent, or Firm*—Linda Deschere

[57] ABSTRACT

The invention provides an electrochemical cell which is at least partially charged and which comprises a first electrode having an active material in particle form consisting essentially of at least partially lithiated graphite. The lithiated graphite particles are prepared by chemically or electrochemically inserting lithium ions into the particles prior to assembly of the cell. A second electrode which is a counter electrode to the first electrode has an active material consisting essentially of vanadium oxide.

15 Claims, 3 Drawing Sheets

OTHER PUBLICATIONS

T.D. Tran, J.H. Feikert, X. Song, and K. Kinoshita, "Commercial Carbonaceous Materials as Lithium Intercalation Anodes", J. Electrochem. Soc., vol. 142, No. 10, 3297–3302, Oct. 1995.

Product Brochure "Graphite for batteries", Lonza G&T, Ltd., (Sins, Switzerland) Date not Available.

Technical Documentation for "Graphite KS 6", Lonza G&T, Ltd., (Sins, Switzerland), Apr. 1993.

Technical Documentation for "Graphite SFG 44", Lonza G&T, Ltd., (Sins, Switzerland), Apr. 1993.

Technical Documentation for "Graphite SFG 15", Lonza G&T, Ltd., (Sins, Switzerland), Apr. 1994.

Technical Documentation for "Graphite KS 15", Lonza G&T, Ltd., (Sins, Switzerland), Apr. 1994.

Technical Documentation for "Graphite KS 44", Lonza G&T, Ltd., (Sins, Switzerland), Apr. 1994.

LITHIUM ION BATTERIES CONTAINING PRE-LITHIATED ELECTRODES

CROSS REFERENCE TO RELATED APPLICATION

This application is a continuation-in-part of U.S. application Ser. No. 08/630,402 filed Apr. 10, 1996, now U.S. Pat. No. 5,643,695 which is a continuation-in-part of U.S. application Ser. No. 08/533,882 filed Sep. 26, 1995, now U.S. Pat. No. 5,660,948.

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells. Such cells typically include an anode (negative electrode) of metallic lithium, a cathode (positive electrode) typically a transition metal chalcogenide and an electrolyte interposed between electrically insulated, spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

It has recently been suggested to replace the lithium metal anode with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the sole called "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art. Such carbon anodes may be prelithiated prior to assembly within the cell having the cathode intercalation material.

One drawback of the carbon anode is that upon initial charging of the cell, when lithium is intercalated into the host carbon, some irreversibility occurs in which lithium and/or the cell electrolyte are consumed, resulting in an initial capacity loss for the cell and a reduction of the cell's overall performance. For example, when the anode material $Li_xC$ is prepared in situ in a cell in order to obtain a state of charge and render the anode to a reduced state, some of the lithium which is transferred to the anode upon initial charging, is irretrievably intercalated into the anode in an irreversible process. Some of the intercalated lithium is, therefore, not deintercalated from the anode during subsequent discharge resulting in the loss of capacity since lithium is not available for electrochemical interaction to produce electrical energy. The progressive loss of capacity during use is referred to as "capacity fade". What is needed is good capacity and good cycle performance, maintaining such capacity over a large number of cycles.

SUMMARY OF THE INVENTION

The present invention provides an electrochemical cell or battery which has a first electrode which is a non-metal, carbonaceous, electrode. A compatible counter electrode is also provided. A specific selection of active materials for each of the electrodes was made. The added feature of pre-lithiation, for one or both of the electrode active materials, provides a superior electrochemical cell having superior capacity and cyclic performance. More specifically, the battery comprises a vanadium oxide positive electrode and a preferred graphite negative electrode. The positive electrode comprises vanadium oxide, represented by the nominal general formula $Li_yV_6O_{13}$, where y is greater than or equal to 0 and less than or equal to 8. $Li_yV_6O_{13}$ is further defined as $Li_yV_6O_{13+v}$ stated below. The battery in an uncharged state, or fully discharged state, has the vanadium oxide compound in a fully or partially lithiated state represented by the nominal general formula $Li_yV_6O_{13}$, where y is greater than 0 and is up to about 8. The battery in a fully charged state preferably has the vanadium oxide compound in an unlithiated state represented by the nominal general formula $Li_yV_6O_{13}$, with y equal to about 0, corresponding to optimally $V_6O_{13}$. If the battery is partially charged, the vanadium oxide compound is partially lithiated, having a value of y greater than 0 and up to about 8. $V_6O_{13}$ is further defined as $V_6O_{13+z}$ below.

The nominal general formulas, $V_6O_{13}$, and $Li_yV_6O_{13}$, respectively, represent a range of vanadium oxide compounds further defined as $V_6O_{13+z}$ and $Li_yV_6O_{13+z}$, where z is equal to or greater than 0 and less than 2. It is preferred that z is greater than 0 and less than or equal to 1.5 ($0<z\leq1.5$).

In one embodiment, the negative electrode comprises a graphite active material. The battery in an uncharged state, or fully discharged state, comprises the graphite $Li_xC_6$ with x equal to about 0. The battery in a fully charged state has lithium inserted in the graphite up to about $Li_xC_6$ where x is greater than 0 and up to about 1. When such graphite is partially lithiated, the $Li_xC_6$ has x greater than 0 and up to about 1.

The invention provides a variety of possible alternatives for pre-lithiation of one or both of the electrodes. In one aspect, the invention provides a cell having a first electrode comprising graphite active material, and a second electrode comprising pre-lithiated $V_6O_{13}$ ($Li_yV_6O_{13}$, $0<y\leq8$). In another embodiment, the first electrode is $V_6O_{13}$, and the second electrode is lithiated graphite ($Li_xC_6$, $0<x\leq1$). In still a third embodiment, each of the electrodes is partially lithiated, that is one electrode is partially lithiated $V_6O_{13}$ ($Li_yV_6O_{13}$, $0<y<8$) and the other electrode is partially lithiated graphite ($Li_xC_6$, $0<x<1$).

In another aspect, the invention provides a method to construct an electrochemical cell having at least one electrode which is pre-lithiated in a precursor cell prior to assembly of the final cell or battery. Preferably, the particles of active material, $V_6O_{13}$ or graphite, or both, are prepared in a precursor cell by pre-lithiating prior to assembly of the final cell. Such pre-lithiation is by chemically or electrochemically inserting lithium ions into the particles. In another aspect, the invention provides a method for operating a cell having the aforesaid one or more pre-lithiated electrodes.

It is preferred that the invention be practiced by pre-lithiating carbon particles. By such pre-lithiation external of the cell, first cycle loss is obviated by forming $Li_xC_6$ where x is greater than 0 and up to about 1. It is also beneficial to at least pre-lithiate the carbon, in combination with pre-lithiation of $V_6O_{13}$, forming $Li_yV_6O_{13}$, y greater than 0 and up to about 8. In the case of such partial pre-lithiation of carbon, at least some of the first cycle loss is reduced. When it is selected to prepare pre-lithiated $V_6O_{13}$, certain preferred graphite materials are used. In addition, when pre-lithiation of $V_6O_{13}$ is used without pre-lithiation of carbon, it is preferred that certain electrolyte mixtures be used, along with specific types of graphites.

Advantageously, the pre-lithiating of $Li_yV_6O_{13}$ may be practiced for any value of y greater than 0. With a value of y greater than 0 and up to about 1, relatively minimal reactivity with air or moisture is observed. As the amount of pre-lithiation increases, the reactivity also increases. Therefore, it is possible to select the desired degree of pre-lithiation which, for the first time, provides flexibility in the manufacturing process while yielding a high performance cell. objects, features, and advantages of the invention include an improved electrochemical cell or battery based on lithium which has improved charging and discharging characteristics; a large discharge capacity; and which maintains its integrity over a prolonged life cycle as compared to presently used cells. Another object is to obviate first cycle capacity loss presently incurred in conventional carbon based anodes.

These and other objects, features, and advantages will become apparent from the following description of the preferred embodiments, claims, and accompanying drawings.

BRIEF DESCRIPTION OF THE DRAWINGS

FIG. 6 is a two part graph with FIG. 6A showing the excellent rechargeability of the $V_6O_{13}$/lithiated graphite cell.

DETAILED DESCRIPTION OF THE PREFERRED EMBODIMENTS

A very large group of metal, alloy, metal oxide, and carbonaceous materials exist. A few have been adapted for use as electrode active materials. The materials have different rate, capacity, life cycle, and stability; and have different counter electrode and electrolyte compatibility features. From this large group, no prior art combination has yet achieved high capacity, approaching theoretical capacity, which is maintained over repeated cycles of use. What is needed is good capacity and good cycle performance, maintaining such capacity over a large number of cycles. The present invention provides a specific selection of active materials. The added feature of prelithiation, provides a superior electrochemical cell having superior capacity and cyclic performance.

The invention provides a variety of possible alternatives for pre-lithiation of one or both of the electrodes. In one aspect, the invention provides a cell having a first electrode comprising graphite active material, and a second electrode comprising pre-lithiated $V_6O_{13}$ ($Li_yV_6O_{13}$, 0<y±8). In another embodiment, the first electrode is $V_6O_{13}$, and the second electrode is lithiated graphite ($Li_xC_6$, 0<x<1). In still a third embodiment, each of the electrodes is partially lithiated, that is one electrode is partially lithiated $V_6O_{13}$ ($Li_yV_6O_{13}$, 0<y<8) and the other electrode is partially lithiated graphite ($Li_xC_6$, 0<x<1).

In another aspect, the invention provides a method to construct an electrochemical cell having at least one electrode which is pre-lithiated. Preferably, the particles of active material, $V_6O_{13}$ or graphite, or both, are pre-lithiated prior to assembly of the final cell, by chemically or electrochemically inserting lithium ions into the particles. In another aspect, the invention provides a method for operating a cell having the aforesaid one or more pre-lithiated electrodes.

It is preferred that the invention be practiced by pre-lithiating carbon particles. By such pre-lithiation external of the cell, first cycle loss is obviated by forming $Li_xC_6$ where x is greater than 0 and up to about 1. It is also beneficial to at least pre-lithiate the carbon, in combination with pre-lithiation of $V_6O_{13}$, forming $Li_yV_6O_{13}$, y greater than 0 and up to about 8. In the case of such partial pre-lithiation of carbon, at least some of the first cycle loss is reduced. When it is selected to prepare pre-lithiated $V_6O_{13}$, certain preferred graphite materials are used. In addition, when pre-lithiation of $V_6O_{13}$ is used without pre-lithiation of carbon, it is preferred that certain electrolyte mixtures be used along with specific types of graphites.

The invention will now be described with reference to at least three different embodiments. In the first embodiment, graphite particles are pre-lithiated, that is, prepared by pre-lithiating the graphite powder prior to assembly of the cell. In this embodiment, essentially any graphitic carbon powder is usable since the pre-lithiation method of the invention substantially reduces and nearly eliminates first cycle capacity loss. In addition, the selection of solvent for the final assembled cell is not critical since there is not a concern with first cycle losses. However, it is preferred to use particles having specific characteristics as will be described further below. In a second embodiment, the invention is described with reference to an electrode active material made of pre-lithiated $V_6O_{13}$. In this case, the pre-lithiated $V_6O_{13}$ positive electrode is used in combination with preferred, selected graphitic carbons and with preferred, selected solvents. In yet a third embodiment where the graphitic active material and the vanadium oxide active material are both pre-lithiated, pre-lithiation of the graphitic particles reduces first cycle capacity loss, but it is not eliminated. In this case, certain preferred, select carbons and solvents are selected.

The active material of the electrode is prepared in a lithiated condition, in a precursor cell, prior to assembly of the final cell or battery. In the case of the vanadium oxide, the starting material for the electrode, $V_6O_{13}$, is lithiated either chemically or electrochemically to form $Li_yV_6O_{13}$, where y is greater than 0, by insertion of lithium into the $V_6O_{13}$ host material. Preparation of the pre-charged $Li_yV_6O_{13}$ (y greater than 0) is, for example, achieved in an electrolytic precursor cell utilizing a metallic lithium anode. In this case, the precursor preparation cell is discharged to a potential corresponding to the desired insertion degree. The desired electrochemical battery is prepared using this pre-lithiated vanadium oxide in combination with the desired counter electrode. Similarly, the graphite electrode is prepared in a pre-charged condition. The starting material for the graphite electrode is lithiated either chemically or electrochemically to form $Li_xC_6$ with x greater than 0, by insertion of lithium into the graphitic host material. As in the case of the vanadium oxide pre-lithiation, such is achieved with an electrolytic precursor cell utilizing a metallic lithium anode. The graphitic electrode and the lithium metal electrode are shorted together allowing lithium to diffuse into the graphite structure.

In either case, such precursor cell is activated by short circuiting the electrode to be lithiated with a strip of lithium metal. In the case of pre-lithiating graphite, the voltage between the two electrodes goes down to 0 indicating that the short circuit is achieved and is permitted to remain for 24 hours. In the case of pre-lithiating vanadium oxide, it is required to lithiate the $V_6O_{13}$ while preventing degradation of the electrode. It is not simply possible to take the cell down to 0 volts, the voltage needs to be controlled so that it does not go lower than about 1.5 volts, the point where decomposition occurs. Therefore, a lithium/$V_6O_{13}$ half cell is prepared and then a DC voltage of about 1.8 volts is applied and allowed to be maintained for a period of time until the current drops to a equilibrium level to intercalate lithium close to the amount of 8 atomic units of lithium for each molecule of the $V_6O_{13}$.

In each case, a separator is maintained between the electrode to be lithiated and the metallic lithium electrode. Such electrolyte provides transport of lithium ions for diffusion into the electrode being lithiated. Preferably, the cell is lithiated in an argon filled atmosphere. The half cell is then disassembled and the electrode is assembled into the final cell.

Pre-lithiation of electrodes in a precursor cell, prior to assembly of final cell, can be accomplished by a variety of methods. In one embodiment, a simple half cell comprising a lithium metal electrode, a $V_6O_{13}$ electrode, and an electrolyte is prepared and then a direct current voltage of about 1.8 volts is applied. The precursor cell is monitored for a period of time sufficient to observe the current drop to an equilibrium level. At this point, essentially full intercalation of lithium, close to 8 atomic units of lithium for every molecule of $V_6O_{13}$ occurs. Similarly, a lithium metal-graphite half cell is prepared in an electrolyte and left for a period of time up to about 24 hours. Essentially, the lithium metal and graphite elements are shorted together as evidenced by a value of about 0 volts. In the case of the lithium-$V_6O_{13}$ half cell, lithium intercalation occurs in a range of about 2.8 down to 1.8 volts. In both cases, it is preferred to conduct the lithiation at an elevated temperature on the order of 50° C. or 60° C. to increase the rate. After lithiation, the $V_6O_{13}$ appears less sensitive to reactivity with air and moisture than the lithiated carbon. It is preferred to lithiate the graphite anode with an excess amount of lithium.

Figure 1:
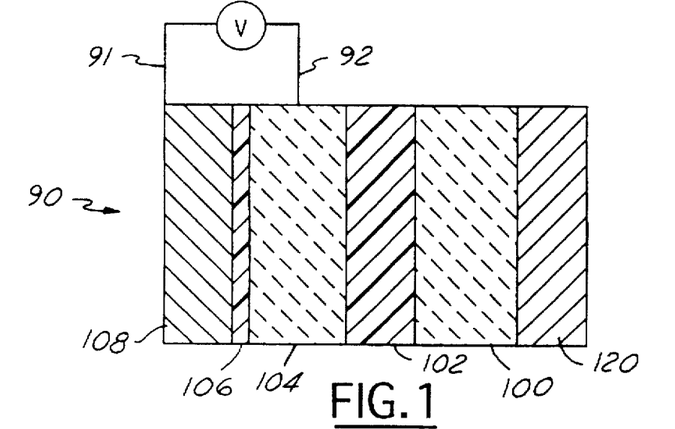
FIG. 1 is an illustration of a cross section of a precursor cell containing components for prelithiation of the graphite electrode. The lithium metal sheet is removed as well as the connection between the graphite and lithium metal after lithiation is completed. Then components are added as necessary and laminated for final assembly of the completed cell or battery as per FIG. 3.
Figure 2:
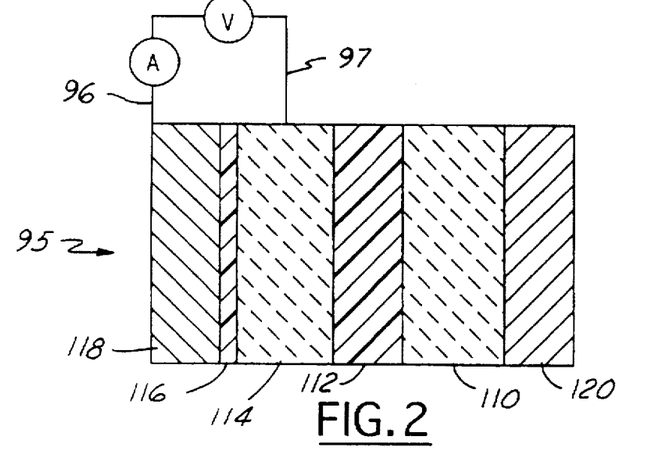
FIG. 2 is an illustration of a cross section of a precursor cell containing components for prelithiation of the vanadium oxide electrode. The lithium metal sheet is removed as well as the connection between the vanadium oxide and lithium metal after lithiation is completed. Then components are added as necessary and laminated for final assembly of the completed cell or battery as per FIG. 3.

In another embodiment, the half cell utilized for pre-lithiation in the precursor cell, forms a portion of the final completed cell. Necessary elements are added or removed after pre-lithiation, followed by hot rolling or lamination to provide the final cell. Referring to FIGS. 1 and 2 it is shown that a graphite/vanadium oxide cell may be formed by lithiating either the graphite anode or the vanadium oxide cathode. The cell is first activated by short circuiting the electrode to be lithiated with a strip of lithium metals. In accordance with the configurations shown in FIGS. 1 and 2, the lithium metal contacts the electrode to be lithiated at an external surface thereof facing away from the separator which will be included in the final cell. The lithiation of the graphite is shown in FIG. 1. Lithiation of the graphite overcomes first cycle inefficiencies typical of graphite and allows for greater cell capacity. As shown in FIG. 1, the precursor cell 90 comprises vanadium oxide 100, separator 102, graphite electrode 104, a second separator 106, and lithium metal 108. The graphite electrode is lithiated by shorting together the graphite electrode with the equivalently sized strip of lithium. Between the two electrodes 104, 108 the separator 106 contains electrolyte used for transport of lithium ions from the lithium metal to the graphite. The precursor cell 90 is shorted together by clipping two tabs 91, 92 together for 24 hours to allow lithium to fully diffuse into the graphite structure. The cell is lithiated in an argon filled atmosphere. Then the lithium strip 108 and electrolyte 106 are removed from the cell 90 and the cell is reassembled with appropriate elements in protective bagging material.

In another embodiment, lithiation is done in the same manner except with the lithium strip 118 facing the vanadium oxide cathode 114 as shown in FIG. 2. The layers of cell 95 in FIG. 2 are graphite electrode 110, cell electrolyte separator 112, vanadium oxide electrode 114, second separator 116, and lithium metal 118. Tabs 96 and 97 provide a path between electrodes 114 and 118 in temporary precursor cell 95. In FIG. 1, the designation "V" stands for voltmeter. In FIG. 2 the designation "A" stands for ammeter. In FIG. 2, "V" stands for a 1.8 volt voltage source. Lithiation of the vanadium oxide is advantageous because the air sensitivity of the materials is reduced. However, the first cycle inefficiency of the graphite must be considered when selecting the solvent. Additionally, the voltage of a shorted lithium-vanadium oxide cell must be maintained above about 1.5 volts. Instead of simply shorting the leads together, the cell must have a DC voltage source to maintain 1.5 volts and the current must be monitored. In both FIGS. 1 and 2, the precursor cell optionally includes a current collector 120 at the electrode which is not being lithiated.

EXAMPLE

Cells were prepared and the graphite lithiated in accordance with the method of the invention defined above.

The anode was fabricated by solvent casting a slurry of graphite, binder, plasticizer, and solvent. The graphite used for the slurry may be either SFG-15 (Lonza G&T. Ltd; Sins, Switzerland) or BG-35 (Superior Graphite, Chicago, Ill.), Kynar Flex 2801® (a 88:12 copolymer of polyvinylidene difluoride (PVDF) and hexafloropropylene (HFP) was used as the binder, a plasticizer and an electronic grade solvent were also used. The slurry was cast onto glass and a free standing electrode was formed as the solvent was evaporated. The anode slurry composition was as follows:

| Component | Wet Weight % | Dry Weight % |
| --- | --- | --- |
| Graphite | 24.3 | 58.3 |
| Binder | 6.8 | 16.4 |
| Plasticizer | 10.5 | 25.3 |
| Solvent | 58.4 | — |
| Total | 100.0 | 100.0 |

The cathode was fabricated by solvent casting a slurry of vanadium oxide, conductive carbon, binder, plasticizer, and solvent. The vanadium oxide used was $V_6O_{13}$ supplied by Kerr-McGee (Soda Springs, Id.); the conductive carbon used was Super P (MMM Carbon), Kynar Flex 2801® was used as the binder along with a plasticizer, and electronic grade acetone was used as the solvent. The slurry was cast onto aluminum foil coated with a polyacrylic acid/conductive carbon mixture. The slurry was cast onto glass and a free standing electrode was formed as the solvent was evaporated. The cathode slurry composition was as follows:

| Component | Wet Weight % | Dry Weight % |
| --- | --- | --- |
| $V_6O_{13}$ | 28.9 | 65.0 |
| Graphite | 2.5 | 5.5 |
| Binder | 4.5 | 10.0 |
| Plasticizer | 8.7 | 19.5 |
| Solvent | 55.4 | — |
| Total | 100.0 | 100.0 |

The separator used to laminate the anode and cathode together and prevent them from electrically shorting together was formed by solvent casting a slurry of fumed silica oxide, binder, and plasticizer diluted with an appropriate solvent. The fumed silica (Cabo-Sil) acts as a filler to provide structure for the separator film. Kynar 2801 was used as the binder. The plasticizer is used to provide film porosity after extraction. Acetone was used as the solvent. The slurry was cast onto glass using a doctor blade to cast an approximately 2.3 mil thick film after solvent evaporation. The separator slurry composition was as follows:

| Component | Wet Weight % | Dry Weight % |
| --- | --- | --- |
| Fumed $SiO_2$ | 6.0 | 22.3 |
| Binder | 8.9 | 33.3 |
| Plasticizer | 11.8 | 44.4 |
| Solvent | 73.3 | — |
| Total | 100.0 | 100.0 |

An electrochemical cell of the anode, separator, and cathode films was formed by first hot pressing two 48 cm² pieces of the respective electrode materials to an expanded metal mesh grid. The films were laminated at 120° C. and 50 psi. Copper grip was used for the anode laminate and aluminum grid was used for the cathode. After initial lamination, the electrodes and separator film were laminated together by hot pressing at 115° C. and 40 psi.

After lamination, the plasticizer was extracted to create cell porosity by washing three times in a methanol bath for 20 minutes for each bath. The cells were dried at 40° C. under vacuum overnight after extraction.

The electrochemical cell was then lithiated in an argon filled glove box by adding a 56 cm² section of glass fiber separator and a 48 cm² section of lithium metal attached to a copper foil current collector. The lithium section was placed against the anode side of the cell. Just prior to placing the lithium section on top of the glass fiber, the separator was fully wetted with electrolyte. The electrolyte used for the cells was a 2:1 ratio of ethylene carbonate to dimethyl carbonate (EC/DMC) with 1 molar $LiPF_6$ as the conductive salt (Grant-Ferro Corp., Zachary La.). The lithium was placed on top of the glass fiber, the cell was placed in a ziplock bag to prevent DMC evaporation during lithiation. The copper foil from the lithium and the copper mesh from the anode laminate were shorted together by connecting them with an alligator clip. The cell was compressed together to hold the lithium and cell sections together. After 24 hours, the clip, lithium, and glass fiber were removed from the cell. The lithiated cell was sealed in appropriate bagging material. Extra electrolyte was added to make up for evaporative losses during assembly (0.5 cc). The bagging material was sealed using a jaw sealer with current collectors sticking out.

The electrolyte used to form the completed final cell or battery comprised ethylene carbonate and dimethyl carbonate (EC/DMC) in a ratio of 2:1 by weight. The positive and negative electrodes were maintained in a separated condition using a fiber glass layer. The electrolyte salt was a concentration of 1 molar $LiPF_6$ providing a liquid electrolyte which interpenetrated the void spaces of the fiber glass layer.

Various methods for fabricating electrochemical cells and batteries and for forming electrode components are further described immediately below. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

Figure 3:
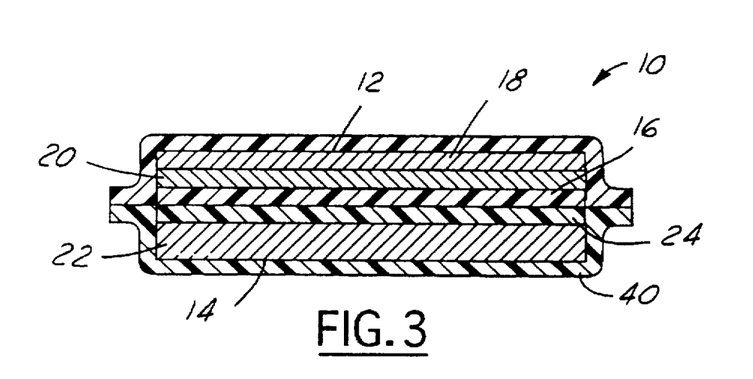
FIG. 3 is an illustration of a cross section of a thin battery or cell embodying the invention.

The pre-lithiated electrodes formed in the precursor cell are used in the final electrochemical cell or battery. A description of the electrochemical cell or battery which uses the novel active material of the invention will now be described. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 3, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,463,179; and 5,482,795. Each of the above patents is incorporated herein by reference in its entirety. Protective bagging material 40 covers the cell and prevents infiltration of air and moisture.

Electrodes having the vanadium oxide active material are generally made by mixing a binder, the vanadium oxide active material, and carbon powder (particles of carbon). Preferably, the content is as follows: 50 percent to 90 percent by weight vanadium oxide active material; 5 percent to 30 percent carbon black as the electric conductive diluent; and 3 to 20 percent binder. The stated ranges are not critical. The active material may range from 25 to 85 weight percent. These electrode materials are mixed and blended together with a solvent. Then the mixture is coated onto a temporary substrate, such as glass, or onto a current collector to achieve a desired thickness for the final electrode.

The graphite based electrode of the invention preferably comprises about 80 to 95 percent by weight of the specific graphite particles, and more preferably about 90 percent by weight, with the balance constituted by a binder. Preferably, the graphitic electrode is prepared from a graphite slurry. The slurry is coated onto a glass substrate or onto a current collector by standard solvent casting techniques, such as by a doctor blade type coating. Preferably, the electrodes are dried to remove residual water prior to making the electrochemical cell.

Generally, the electrolyte used to form the completed cell comprises a mixture of organic solvents and an electrolyte salt. A typical electrolyte salt is $LiPF_6$, included in the electrolyte composition at a 1 molar concentration. The selection of electrolyte solvent mixture for the final cell or battery is not critical in the case of pre-lithiated graphite electrode. The selection of solvent is critical when pre-lithiation of the graphite electrode is not conducted.

Turning now to the specific characteristics of the active materials, characteristics of the vanadium oxide and graphite will be described followed by a discussion of the solvents preferred to be used with the graphite electrode when such electrodes are not pre-lithiated. The nominal general formula $V_6O_{13}$ represents a relatively narrow range of vanadium oxide compounds with nominal stoichiometry which ranges from $VO_b$ where b is greater than 2 and less than 3 which are readily prepared by thermal decomposition of ammonium vanadate, $NH_4VO_3$, as reported in U.S. Pat. No. 4,228,226 the disclosure of which is incorporated herein by reference in its entirety. Typically, the VO compounds will range from $VO_b$ where b is greater than 2 and less than or equal to 2.5 ($VO_b$, $2<b\leq2.5$). It has been determined that $V_6O_{13+z}$ where the value of z is equal to or greater than 0, and less than or equal to 2, is highly desirable and is able to be prepared by the method described by Saidi in U.S. Pat. No. 5,419,890, the disclosure of which is incorporated herein by reference in its entirety. Preferably in $V_6O_{13+z}$, the value of z is 0<z<2. Correspondingly, the nominal general formula of the $Li_yV_6O_{13}$ represents a relatively narrow range of highly desirable lithiated vanadium oxide compounds further defined as $Li_yV_6O_{13+z}$, where z is greater than 0 and less than or equal to 2. Accordingly, highly desirable compounds are the as prepared $V_6O_{13+z}$; and its lithiated form, $Li_yV_6O_{13+z}$ where y is greater than 0 and less than or equal to 8 (0<y≦8), and z is equal to or greater than 0 and less than 2. Preferably, z is in a range $0<z\leq1.5$; corresponding to up to $V_6O_{14.5}$, and up to $Li_yV_6O_{14.5}$.

In the case where pre-lithiated graphite electrode is not formed, or in the case where such pre-lithiation occurred and optimum performance is desired, specific graphites having specific characteristics are preferred. Such graphites permit the attainment of specific capacities on the order of 330 to 360 milliamp hours per gram. This exceptionally high capacity is advantageously maintained during cyclic operation. Specific graphites exhibiting this type of performance are as exemplified by graphitic materials sold under the designation SFG by Lonza G. & T., Limited (Sins, Switzerland). Specifically, the graphites are designated as SFG-6™, SFG-10™, and SFG-15 ™. Each of these graphites has an ash content of 0.15 percent by weight maximum, a moisture content of 0.5 percent by weight maximum, and an interlayer distance of 0.3354 to 0.3358. Each of these graphites is also characterized by a crystallite size $L_c$, of greater than 90 and less than 1000 nanometers. Each of these graphites is also characterized by a density determined by the Xylene method of 2.26 grams per cubic centimeter and by the Scott method 0.07 to 0.09 grams per cubic centimeter. The features of the specific graphites are included in Table I along with comparative data for other graphites tested. Further characteristics for the three specific graphites of the invention will now be described, and are shown in Tables II and III.

The preferred SFG-6 and 10 have many values the same as that for SFG-15 in Table II. The desirable SFG-6 and 10 have the same ash content, moisture content, interlayer distance, purity, and $d_{002}$ as are shown in Table II for SFG-15. The SFG-6, 10, and 15 series differ in particle size, crystalline size ($L_c$), BET area, and density according to the Scott method. The undesirable graphite SFG-44 has very different particle size, crystalline size ($L_c$), BET area, and density according to the Scott method.

SFG-6™ has a crystalline size $L_c$ greater than 100 nanometers, a BET surface area of 15.2 square meters per gram, and a particle size distribution wherein essentially 100 percent by weight of the particles have a size less than 12 microns, 97 percent by weight less than 8 microns, 95.8 percent by weight less than 6 microns, and a median particle size of 3.2 microns. The density in Xylene is as per SFG-15, but density by the Scott method for SFG-6 is 0.07 grams per cubic centimeter. (Table III.)

SFG-10™ has a crystalline size $L_c$ greater than 150 nanometers, a BET surface area of 11.1 square meters per gram, and a particle size distribution based on percent by weight as follows: essentially 100 percent less than 32 microns, 94.9 percent less than 12 microns, 75 percent less than 8 microns, and a median particle size of 5.8 microns. (Table III.) The density is the same as that stated for SFG-6, in Xylene and per Scott.

SFG-15™ has a crystalline size $L_c$ greater than 120 nanometers, a BET surface area of about 8.8 square meters per gram, and a particle size distribution where essentially 100 percent of the particles have a size less than 48 microns, 99 percent of the particles have a size less than 24 microns, 94 percent of the particles have a size less than 16 microns, and a median particle size of 8.1 microns.

Each of the three graphites of the invention, SFG-6, 10, and 15 have an interlayer distance spacing of 002 planes of preferably 0.3355. This interlayer distance spacing is designated in the literature as c/2 or $d_{002}$. Each of the above graphites is anisotropic, which means that one or more fundamental physical properties, for example, electronic resistivity, varies with direction. The specific graphites designated above as SFG-6, 10, and 15 have high anistropy.

Physical features of the invention as defined above are obtained by measurements from x-ray wide angle diffraction. Analysis of x-ray diffraction by crystals is well known in the art. According to analysis by Bragg diffraction, any set of equally spaced planes in a crystal acts as a set of mirrors for x-rays; for constructive interference, the beam must be incident on a set of planes that such a glancing angle θ indicated by: 2dθ=mλ, where d is the distance between planes and m is an integer. Therefore, as is well known in the art, the lattice Constance for carbon material is determinable from 002 lines. Crystallite size along the c-axis ($L_c$) and the a-axis ($L_a$) is determinable from half widths of 002 and 110 lines, respectively, by x-ray diffraction with an internal standard. A typical internal standard for carbon analysis is silicon used with CUKα radiation. A description of the x-ray wide angle diffraction analysis method is given in U.S. Pat. No. 4,945,014 incorporated herein by reference in its entirety. The term "$d_{002}$" is used interchangeably with the term "C/2". From methods such as described in the '014 patent, one is able to obtain lattice constant, a, the average plane spacing, $d_{002}$ (C/2) , and the size of the crystallite domains, $L_a$ and $L_c$, to character carbons. $L_a$ and $L_c$, are normally determined using the Scherrer equations as defined in the '014 patent incorporated herein by reference. Using the widths of the 002 and 110 peaks it is possible to obtain values for $L_a$ and $L_c$ as shown in Column 14 of U.S. Pat. No. 4,945,014 previously incorporated by reference in its entirety. Such analysis is based on the understanding that each carbon grain is made up of many small regions characterized by $L_a$ and $L_c$, which scatter x-rays incoherently with respect to one another; the small regions which scatter coherently within themselves are defined by $L_a$ and $L_c$.

The electrolyte usable with the specific carbons of the invention is preferably a mixture of solvents. It may be a conventional solvent, such as EC/DMC (ethylene carbonate/dimethyl carbonate). In another preferred embodiment, the mixture of solvents comprises: (i) ethylene carbonate; and (ii) a solvent selected from the group consisting of propylene carbonate (PC), butylene carbonate (BC), and mixtures of PC and BC. It is preferred that the EC is present in an amount by weight which is at least as great as the amount of the selected solvent, namely, the PC, the BC, or the mixture of PC and BC. In another embodiment, the mixture of solvents comprises propylene carbonate and ethylene carbonate, with the ethylene carbonate being present in an amount by weight which is at least as great as the amount of the propylene carbonate. Desirably, the solvent mixture comprises EC and PC in a weight ratio of 50EC:50PC to 75EC:25PC. Alternatively, the mixture desirably comprises 50EC:50BC.

If desired, one or more additional organic solvents may be included in the solvent mixture. Such other organic solvents are selected from the group consisting of methyl ethyl carbonate (MEC), diethyl carbonate (DEC), dipropyl carbonate (DPC), dimethyl carbonate (DMC), and mixtures thereof. A preferred solvent mixture includes EC, PC and DMC where the EC is present in an amount not less than the amount by weight of the DMC and as stated earlier the EC is present is an amount by weight not less than of the PC. Accordingly, such solvent mixture preferably comprises the weight ratio 1EC:1PC:1DMC, corresponding to ⅓EC:⅓PC:⅓DMC and up to 50EC:25PC:25DMC. This corresponds to 1EC:1PC:1DMC to 2EC:1PC:1DMC. In still another desirable embodiment, the solvent mixture comprises 1EC:1PC:1BC to 2EC:1PC:1BC. Regardless of the nature of the one or more additional organic solvents besides EC and PC, the one or more other organic solvents preferably have a boiling point less than the boiling point of EC due to its tendency to solidify at ambient temperatures.

The propylene carbonate has a boiling point of approximately 240° C. and a melting temperature of approximately −49° C. It is a ringed structure. Other characteristics are as shown in Table IV. The ethylene carbonate has a boiling point of 248° C, a melting temperature of about 39° C. to 40° C., and is also a ringed structure. The optional third solvent mixture component is preferably dimethyl carbonate which contains a carbon situated between two single bond oxygens and carrying a double bond to a third oxygen. Each of the single bonded oxygen are bonded in turn to respective methanes. The DMC has a boiling temperature of 91° C. and a melting temperature of 4.6° C. As can be seen in Table IV, the boiling temperature of DMC is lower than the boiling temperature of the EC and lower than the boiling temperature of the PC which means the DMC is considerably more volatile. As can also be seen from Table IV, the melting temperature of DMC is lower than the melting temperature of EC. It is preferred that if one or more additional organic solvents are added to the basic EC/PC mixture of the invention, that such added organic solvent have a boiling temperature lower than that of the EC and preferably a melting temperature lower than the EC in order to help maintain the EC solvent in a liquid state.

The negative electrode and positive electrode are assembled in the final electrode cell or battery of FIG. 3 with the electrolyte which provides ionic conductivity between the positive and negative electrode. Typically and preferably, the electrolyte is in the form of an electrolyte separator which further comprises a solid matrix forming a network with voids interpenetrated by the solvent mixture in solute. Essentially any type of electrolyte separator arrangement may be selected so long as the solvent consists of the preferred organic solvents mentioned above. In one embodiment, the electrolyte separator has a solid matrix which is a polymeric acrylate formed from acrylate precursors which are applied to a surface of the cathode or anode and then polymerized to form an electrolyte/electrode composite. In another embodiment the matrix is a porous polypropylene or polyethylene sheet or a sheet of fiber glass material placed between the anode and cathode. The nature of the electrolyte separator is not critical so long as it is used with the solvent mixture of the invention along with the stated graphite negative electrode defined by the invention.

Figure 4:
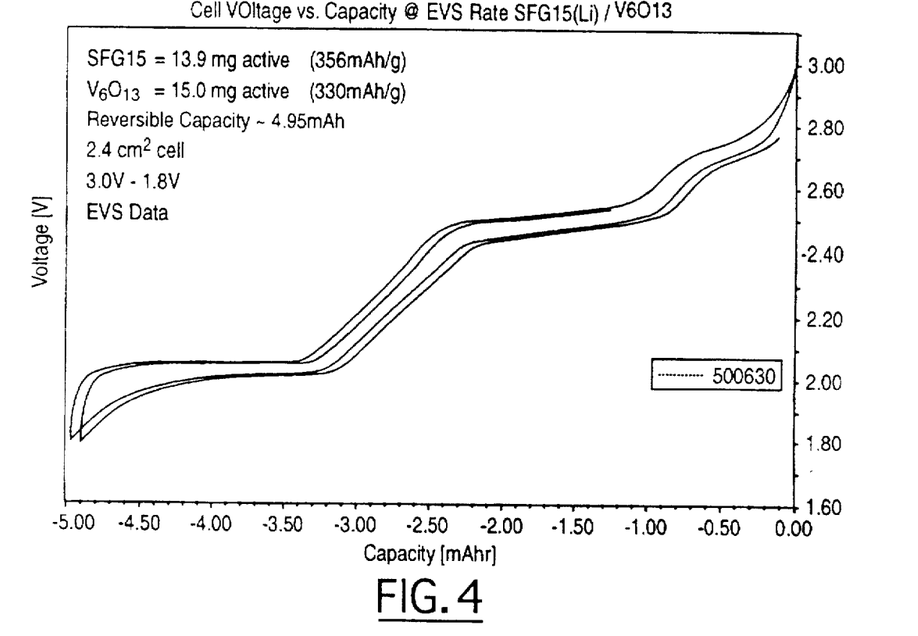
FIG. 4 is an EVS (Electrochemical Voltage Spectroscopy) voltage/capacity profile for a cell embodying the preferred electrodes of the invention. The conditions are ±10 millivolt steps between 3.0 and 1.8 volts, and a critical limiting current density is less than or equal to 0.05 milliamps per centimeter square.

FIG. 4 shows a voltage profile of a rocking chair battery, based on $V_6O_{13}$ positive electrode and the lithiated SFG-15 graphite negative electrode of the invention. This data was obtained in a two electrode cell.

FIG. 4 is based on 4.95 milliamp hour reversible capacity, 2.06 milliamp hours per square centimeter, 2.4 square centimeter electrodes, a graphite active material loading of about 13.9 milligrams per square centimeter (unlithiated), and a $V_6O_{13}$ loading of about 15.0 milligrams per square centimeter. These values are for active material only and do not include binder or conductive diluent. The electrochemical properties were determined using Electrochemical Voltage Spectroscopy (EVS) technique. Electrochemical and kinetic data were recorded using the Electrochemical Voltage Spectroscopy (EVS) technique. Such technique is known in the art as described by J. Barker in Synth. Met 28, D217 (1989); Synth. Met. 32, 43 (1989); J. Power Sources, 52, 185 (1994); and Electrochemica Acta, Vol. 40, No. 11, at 1603 (1995).

FIG. 4 clearly shows and highlights the very high and heretofore unexpected degree of reversibility of lithium ion reactions of the cell of the invention. The negative electrode showed a performance of 356 milliamp hours per gram and the positive electrode showed a performance of 330 milliamp hours per gram on the first discharge. In FIG. 4 the capacity in is essentially 5.0 milliamp hours, and the capacity out is essentially 4.95 milliamp hours. The result is a capacity loss of only about 0.05 milliamp hours, corresponding to a remarkably low 1.0 percent loss. The first cycle capacity loss is calculated by taking the difference between the first cycle charge capacity and the first cycle discharge capacity and dividing by the first cycle charge capacity, multiplied by 100 percent. FIG. 4 shows the excellent reversibility and low over voltage for the system as denoted by the small separation between discharge and charge curves.

Figure 5:
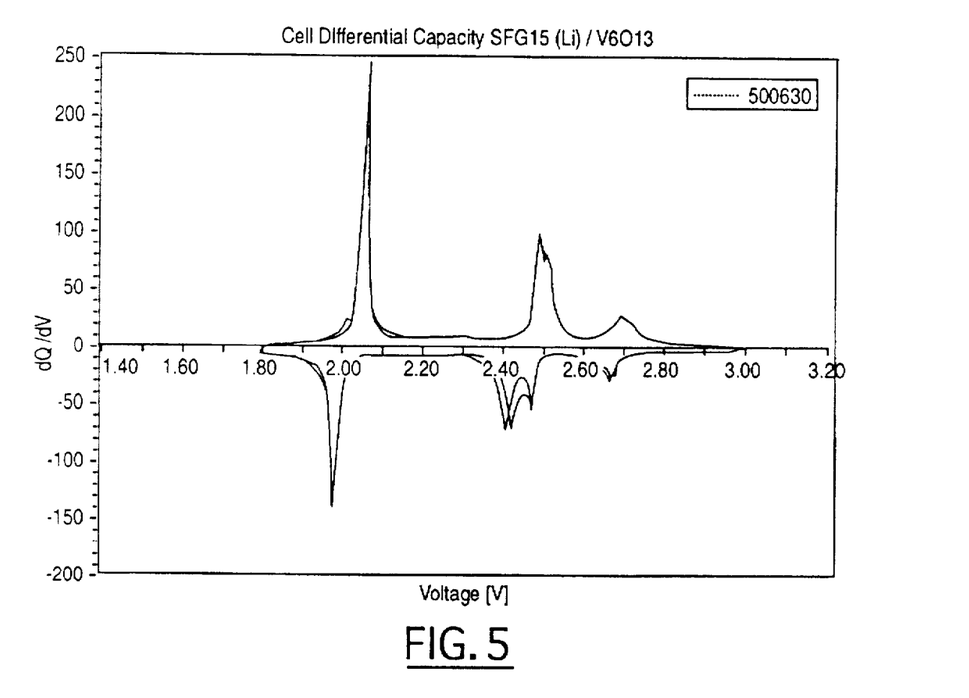
FIG. 5 is an EVS differential capacity plot for the cell as described in connection with FIG. 4.

FIG. 5 is an EVS of the differential capacity plot based on FIG. 4 for lithiated SFG-15/$V_6O_{13}$ with 2:1 EC/DMC by weight, with $LiPF_6$ salt. As can be seen from FIG. 5 the relatively symmetrical nature of the peaks indicates good electrochemical reversibility with relatively small peak separations on charge (above the axis) and discharge (below the axis). There are essentially no peaks that can be related to irreversible reactions. All peaks above the axis have corresponding peaks below the axis. If breakdown of graphite was observed, there would have been an irreversible charge consumption. Absence of such is further evidence of the unique and unexpected advantage of the present invention.

FIG. 5 demonstrates and confirms the excellent reversibility of the system.

Figure 6A:
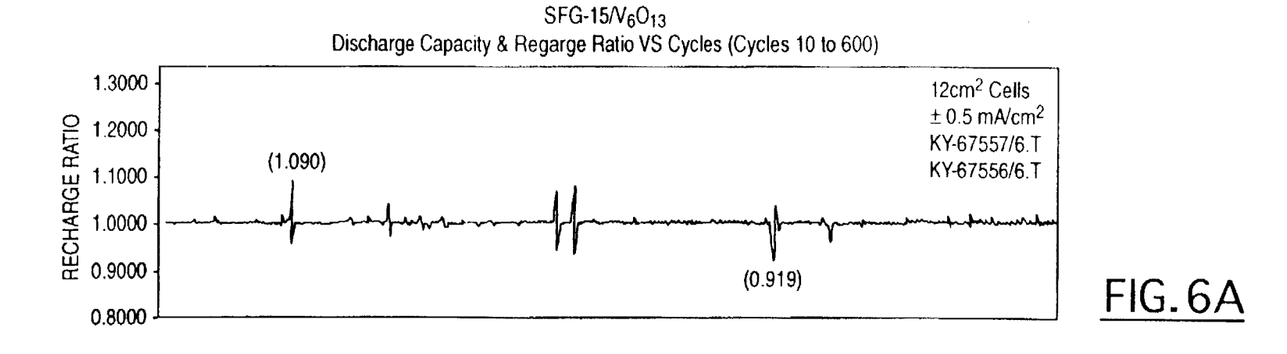
Figure 6B:
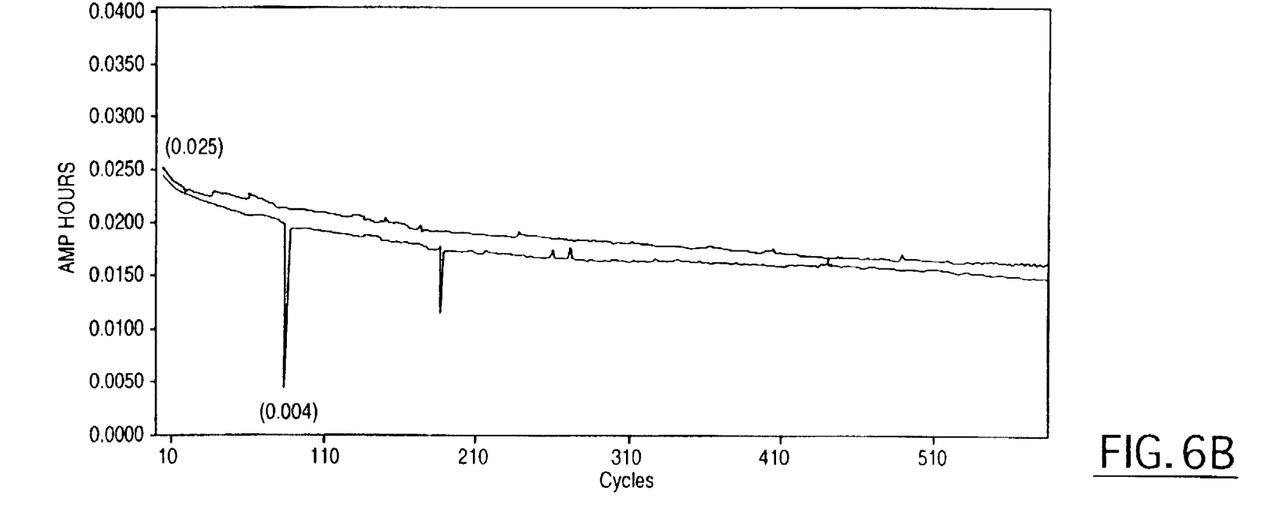
FIG. 6B shows the excellent cycling and capacity of the cell. Charge and discharge are at ±0.5 milliamp hours per centimeter square, between 1.8 and 3.0 volts for 10 to 600 cycles.

FIG. 6 is a two part graph with FIG. 6A showing the excellent rechargeability of the $V_6O_{13}$/lithiated SFG-15 graphite cell. FIG. 6B shows the excellent cycling and capacity of the cell. The capacity was determined at constant current cycling ±0.5 milliamps per centimeter squared, for over 500 cycles with a voltage range of 3.0 to 1.8 volts, using 12 centimeter square respective electrodes. As in the case for the earlier FIGS. 4 and 5 the cell contained the same components for the electrolyte. FIG. 6 shows long cycle life demonstrated by the relatively slow capacity fade with cycle numbers (confirmed by both cells in the group). The recharge ratio data shows the absence of any appreciable side reactions over the extended life cycling.

While this invention has been described in terms of certain embodiments thereof, it is not intended that it be limited to the above description, but rather only to the extent set forth in the following claims.

TABLE I

| Carbon Material | Surface Area ($m^2/g$) (BET) | Coherence Length $L_c$ (nm) | Density $(g/cm^3)^2$ | Particle Size[1] | Median Size $d_{50}$ (μm) | Interlayer Distance c/2 (nm) |
| --- | --- | --- | --- | --- | --- | --- |
| SFG-6 | 15.2 | >100 | 2.26 | <6 | 3.2 | 0.3355 |
| SFG-10 | 11.1 | >150 | 2.26 | <12 | 5.8 | 0.3355 |
| SFG-15 | 8.8 | >120 | 2.26 | <16 | 8.1 | 0.3355 |
| SFG-44 | 4.2 | <200 | 2.26 | <48 | 22 | 0.3355 |
| KS-10 | 16 | 80 | 2.255 | <12 | 5.9 | 0.3357 |
| KS-15 | 14 | 90 | 2.255 | <16 | 7.7 | 0.3356 |
| KS-25 | 13 | 90 | 2.255 | <24 | 10.5 | 0.3356 |
| BG-35 | 7 | >1000 | 0.195 | <36 | 17 | N/A |
| F-399 | 23 | >1000 | 2.20 | <35 | 16 | N/A |
| MCMB-25-28 | N/A | >1000 | 2.24 | 37 | 22.5 | 0.336 |

[1]Maximum size for at least 90% by weight of graphite particles, interpolated for F-399 based on 87% less than 31 microns (μm), and 96% less than 44 micron (μm).
[2]In xylene.
Note: SFG and KS series are synthetic, anisotropic graphite. BG series is a flake natural graphite. F series is natural graphite. MCMB series is meso phase micro beads.

TABLE II

| Graphite SFG-15 Specifications | | |
| --- | --- | --- |
| Guaranteed Values | | |
| Ash | (%) max | 0.15 |
| Moisture | (%) max | 0.5 |
| Crystallite Height | (nm) min | 100 |
| Interlayer Distance | (nm) | 0.3354–0.3358 |
| Particle Size <16 micron | (%) min, Laser | 90 |
| Typical Values | | |
| Purity | | |
| Ash | (%) | 0.1 |
| Al | (ppm) | 35 |
| As | (ppm) | <1 |
| Ca | (ppm) | 170 |
| Co | (ppm) | <1 |
| Cr | (ppm) | 4 |
| Cu | (ppm) | <1 |
| Fe | (ppm) | 135 |
| Mo | (ppm) | <1 |
| Ni | (ppm) | 3 |
| Pb | (ppm) | <1 |
| Sb | (ppm) | <2 |
| Si | (ppm) | 450 |
| Ti | (ppm) | 7 |
| V | (ppm) | 2 |
| S | (ppm) | 60 |

TABLE II-continued

Graphite SFG-15 Specifications

| Crystallinity | | |
|---|---|---|
| LC | (nm) | >120 |
| c/2 ($d_{002}$) | (nm) | 0.3355 |
| Density | | |
| Xylene | (g/ccm) | 2.26 |
| Scott | (g/ccm) | 0.09 |
| Specific Surface Area | | |
| BET | (sqm/g) | 8.8 |
| Particle Size Distribution (Laser Diffraction) | | |
| <2 micron | (%) | 2 |
| <4 micron | (%) | 13 |
| <6 micron | (%) | 30 |
| <8 micron | (%) | 49 |
| <12 micron | (%) | 79 |
| <16 micron | (%) | 94 |
| <24 micron | (%) | 99 |
| <48 micron | (%) | 100 |
| $d_{50}$ | (μm) | 8.1 |

TABLE III

Particle Size Distribution (Laser Diffraction)

| Graphite SFG-6 | | |
|---|---|---|
| <1 micron | (%) | 2.8 |
| <1.5 micron | (%) | 5.7 |
| <2 micron | (%) | 16.9 |
| <3 micron | (%) | 47.7 |
| <4 micron | (%) | 68.8 |
| <6 micron | (%) | 95.8 |
| <8 micron | (%) | 97.3 |
| <12 micron | (%) | 100 |
| $d_{50}$ | (μm) | 3.2 |
| Graphite SFG-10 | | |
| <1 micron | (%) | 0.4 |
| <2 micron | (%) | 4.8 |
| <4 micron | (%) | 29.5 |
| <6 micron | (%) | 57.1 |
| <8 micron | (%) | 75.3 |
| <12 micron | (%) | 94.9 |
| <16 micron | (%) | 98.5 |
| <32 micron | (%) | 100 |
| $d_{50}$ | (μm) | 5.8 |

The embodiments of the invention in which an exclusive property or privilege is claimed are defined in the following claims:

1. An electrochemical cell which is at least partially charged and which comprises a first electrode having an active material in particle form consisting essentially of at least partially lithiated graphite corresponding to $Li_xC_6$ where x is greater than 0 and up to about 1, said lithiated graphite particles prepared by chemically or electrochemically inserting lithium ions into said particles prior to assembly of said cell; and a second electrode which is a counter electrode to the first electrode, said second electrode having an active material consisting essentially of $Li_yV_6O_{13}$, where y is greater than or equal to 0 and up to about 8.

2. The electrochemical cell according to claim 1 which is fully precharged in an initial, as prepared, as assembled condition, with x equal to about 1, and with y equal to 0, corresponding to $V_6O_{13}$ and to $LiC_6$.

3. The electrochemical cell according to claim 1 having at least partially lithiated $Li_yV_6O_3$ corresponding to y equals at least 1 which is relatively more air stable than said lithiated graphite.

4. The precharged electrical cell according to claim 1 wherein said graphite particles have an interlayer distance spacing of 002 planes ($d_{002}$) as determined by x-ray diffraction of 0.330 to 0.340 nanometers (nm), a crystallite size in the direction of c-axis ($L_c$) being greater than about 90 nanometers (nm) and less than about 1000 nanometers, and at least 90 percent by weight of said graphite particles having a size less than about 24 microns (Am).

5. The battery according to claim 4 wherein said graphite particles have a BET surface area greater than about 4 square meters per gram ($m^2/g$) and up to about 16 meters square per gram ($m^2/g$).

6. The battery according to claim 4 wherein the crystallite size ($L_c$ is greater than about 100 nanometers (nm).

7. The battery according to claim 4 wherein the crystallite size ($L_c$) is less than about 200 nanometers (nm).

8. The battery according to claim 1 wherein said electrolyte comprises a solute and a solvent mixture; said solute comprising a salt of a metal; said solvent mixture comprising (i) ethylene carbonate (EC), and (ii) a solvent selected from the group consisting of propylene carbonate (PC), butylene carbonate (BC), and mixtures thereof with the ethylene carbonate being present in an amount by weight which is at least as great as the amount of any other solvent.

9. The battery according to claim 1 wherein said electrolyte comprises a solute and a solvent mixture; said solute comprising a salt of a metal; said solvent mixture consisting essentially of propylene carbonate (PC), ethylene carbonate (EC), and optionally one or more other organic solvents having a boiling point less than the boiling of point of said EC; with the ethylene carbonate being present in an amount by weight which is at least as great as the amount of

TABLE IV

Characteristics of Organic Solvents

| | PC | EC | DMC | DEC | BC | MBC | DPC |
|---|---|---|---|---|---|---|---|
| Boiling Temperature (C.) | 240 | 248 | 91.0 | 126 | 230 | <126 | 167–168 |
| Melting Temperature (C.) | −49 | 39–40 | 4.6 | −43 | — | −55 | — |
| Density (g/cm$^3$) | 1.198 | 1.322 | 1.071 | 0.98 | 1.139 | 1.007 | 0.944 |
| Solution Conductivity (S/cm) | $2.1 \times 10^{-9}$ | $<10^{-7}$ | $<10^{-7}$ | $<10^{-7}$ | $<10^{-7}$ | $6 \times 10^{-9}$ | $<10^{-7}$ |
| Viscosity (cp) at 25° C. | 2.5 | 1.86 (at 40° C.) | 0.59 | 0.75 | 2.52 | 0.65 | — |
| Dielectric Constant at 20° C. | 64.4 | 89.6 (at 40° C.) | 3.12 | 2.82 | — | — | — |
| Molecular Weight | 102.0 | 88.1 | 90.08 | 118.13 | 116.12 | 104.10 | 146.19 |
| H$_2$O Content | <10 ppm | <10 ppm | <10 ppm | <10 ppm | <10 ppm | <10 ppm | <10 ppm |
| Electrolytic Conductivity (mS/cm) 20° C. 1M LiAsF$_6$ | 5.28 | 6.97 | 11.00 (1.9 mol) | 5.00 (1.5 mol) | <3.7 | — | — | propylene carbonate and at least as great as the amount of any said other solvent, respectively.

10. An electrochemical cell comprising a first electrode having an active material consisting essentially of lithiated vanadium oxide corresponding to $Li_yV_6O_{13}$, where y is greater than 0 and up to about 8; and a second electrode which is a counter-electrode to the first electrode, said second electrode having an active material consisting essentially of graphite particles characterized by an interlayer distance spacing of 002 planes ($d_{002}$) as determined by x-ray diffraction of 0.330 to 0.340 nanometers (nm), a crystallite size in the direction of c-axis ($L_6$) being greater than about 90 nanometers (nm) and less than about 1000 nanometers, and at least 90 percent by weight of said graphite particles having a size less than about 24 microns (μm).

11. The battery according to claim 10 wherein said graphite particles have a BET surface area greater than about 4 square meters per gram ($m^2/g$) and up to about 16 meters square per gram ($m^2/g$).

12. The battery according to claim 10 wherein the crystallite size ($L_c$) is greater than about 100 nanometers (nm).

13. The battery according to claim 10 wherein the crystallite size ($L_c$) is less than about 200 nanometers (nm).

14. The battery according to claim 10 wherein said electrolyte comprises a solute and a solvent mixture; said solute comprising a salt of a metal; said solvent mixture comprising (i) ethylene carbonate (EC), and (ii) a solvent selected from the group consisting of propylene carbonate (PC), butylene carbonate (BC), and mixtures thereof with the ethylene carbonate being present in an amount by weight which is at least as great as the amount of any other solvent.

15. The battery according to claim 10 wherein said electrolyte comprises a solute and a solvent mixture; said solute comprising a salt of a metal; said solvent mixture consisting essentially of propylene carbonate (PC), ethylene carbonate (EC), and optionally one or more other organic solvents having a boiling point less than the boiling of point of said EC; with the ethylene carbonate being present in an amount by weight which is at least as great as the amount of propylene carbonate and at least as great as the amount of any said other solvent, respectively.

* * * * *